(12) United States Patent
Tyan et al.

(10) Patent No.: US 6,497,988 B2
(45) Date of Patent: Dec. 24, 2002

(54) PHASE-CHANGE RECORDING ELEMENT FOR WRITE ONCE APPLICATIONS

(75) Inventors: Yuan-Sheng Tyan, Webster, NY (US); Thomas R. Cushman, Fairport, NY (US); Giuseppe Farruggia, Webster, NY (US); George R. Olin, Webster, NY (US); Bruno Primerano, Walworth, NY (US); Fridrich Vazan, Pittsford, NY (US); James A. Barnard, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 112 days.

(21) Appl. No.: 09/791,322

(22) Filed: Feb. 22, 2001

(65) Prior Publication Data

US 2002/0160304 A1 Oct. 31, 2002

(51) Int. Cl.$^7$ .......................... G11B 7/0045; G11B 7/24
(52) U.S. Cl. ................. 430/270.13; 430/945; 428/64.4; 428/64.5; 428/64.6
(58) Field of Search ........................... 430/270.13, 945; 428/64.4, 64.5, 64.6

(56) References Cited

U.S. PATENT DOCUMENTS

| | | |
|---|---|---|
| 4,774,170 A | 9/1988 | Pan et al. |
| 4,795,695 A | 1/1989 | Pan et al. |
| 4,798,785 A | 1/1989 | Pan et al. |
| 4,812,386 A | 3/1989 | Pan et al. |
| 4,865,955 A | 9/1989 | Pan et al. |
| 4,904,577 A | 2/1990 | Tyan et al. |
| 4,960,680 A | 10/1990 | Pan et al. |
| 5,077,181 A | 12/1991 | Pan et al. |
| 5,242,784 A | 9/1993 | Chen et al. |
| 5,271,978 A | 12/1993 | Vazan et al. |
| 6,224,960 B1 * | 5/2001 | Tyan et al. ................. 428/64.2 |

FOREIGN PATENT DOCUMENTS

JP   2000-222776 A   *   8/2000

OTHER PUBLICATIONS

IBM Technical Disclosure Bulletin; vol. 29, No. 8, pp. 3748–3749; "Highly Compatible Write–Once and Reversible Optical Recording Media"; Jan. 1987.*
Kobori et al, High–density mark position recording on a 90 mm phase–change optical disk, SPIE vol. 2514, pp. 312–318.
Nishimura et al, High density recording using phase change optical disk, SPIE 2514, pp. 319–328.
Nagata et al, Phase–shift recording characteristics of phase–change optical disc (5), 44th Spring Meeting, Japan Society of Applied Physics and Related Societies 31a–NF–5, Mar. 1997.

* cited by examiner

Primary Examiner—John A. McPherson
(74) Attorney, Agent, or Firm—Raymond L. Owens

(57) ABSTRACT

A WORM optical recording element includes a substrate; an amorphous phase-change recording layer disposed over the substrate; a dielectric layer disposed adjacent to the amorphous phase-change layer; a reflector layer disposed adjacent to the dielectric layer; and wherein the material and the thickness of the layers are selected such that recording can be performed on the optical recording element by using a focused laser beam to form crystalline marks in the phase-change layer using laser pulses with less than 40 nS in duration, the reflectivity of the amorphous phase as measured by a collimated beam is higher than 28% and the contrast of the read-back signal is higher than 0.6, and the second and subsequent writing over previous recording results in at least a 50% increase in read out jitter.

11 Claims, 2 Drawing Sheets

PHASE-CHANGE RECORDING ELEMENT FOR WRITE ONCE APPLICATIONS

CROSS REFERENCE TO RELATED APPLICATION

Reference is made to commonly-assigned U.S. patent application Ser. No. 09/313,951 filed May 18, 1999, now U.S. Pat. No. 6,224,960, entitled "Phase-Change Recording Optical recording element for Write Once Applications" by Tyan et al, the disclosure of which is incorporated herein.

FIELD OF THE INVENTION

The present invention relates to a phase-change optical recording element that is particularly suitable for burn-dark type write-once read-many times (WORM) applications.

BACKGROUND OF THE INVENTION

Optical recording has been increasingly used in recent years to publish, distribute, store, and retrieve digital information. This is done by focusing a laser beam to write and/or read information on an optical recording element usually in the form of a spinning disk. In the read-only memory (ROM) format, the information is prefabricated at the factory in the form of encoded small features on the element and the laser beam is used to read back the information. In the writeable formats, the laser beam is used to create the small encoded marks through a variety of physical recording mechanisms. This permits a user to record their own data on the disk. Some recording physical mechanisms are reversible. The recorded marks can be erased and remade repeatedly. Disks that utilize these mechanisms are called Erasable or Re-writeable disks. Some of these physical mechanisms are one way, once the marks are made they cannot be reversed or altered without leaving a clearly identifiable trace that can be detected. Disks that use these mechanisms are called WORM (Write-Once-Read-Many times) disks. Each of these formats is suitable for certain practical applications.

The popularity of compact disk recordable (CD-R), a WORM disk, is because WORM disks are suitable for many applications. In some of these applications, the data need to be stored in such a form that any modification to the content is not possible without leaving an easily detectable trace. For example, attempts to record over a previously recorded area may result in an increase in the read-back data jitter. An increase in data jitter of 50% is easily detectable and can be used to identify a recording element that has been modified. Recording elements that possess features that allow detection of modification attempts are hereto referred to as true-WORMs. In some other applications such publishing and data distribution, the lower cost of WORM recording element makes them desirable. Yet in some other applications some performance advantages of WORM recording elements such as a higher writing speed becoming the determining feature in choosing WORM elements over rewriteable elements. Because of the success of the CD formats, currently CD-R (compact disc-recordable) is the most demanded WORM recording format. With the advent of other formats, WORM recording elements compatible with those formats will be in demand as well. For example, WORM disks based on the digital versatile disc (DVD) format, hereto referred to as DVD-WORM, are expected to be in demand because of the increasing popularity of the DVD format.

A useful DVD-WORM disk needs to be compatible with the DVD-ROM or DVD-Video disks. It needs to meet the many physical properties already defined for the DVD-format disks. In addition, for the disk to be widely accepted, the cost needs to be low. There is a need for an improved WORM optical recording element that will function successfully as a DVD-WORM.

Many physical mechanisms have been used for WORM recording. The first practical WORM optical recording element utilized ablative recording where the pulsed laser beam is used to create physical pits in the recording layer. This mechanism requires the recording elements to be in an air-sandwiched structure to leave the surface of the recording layer free from any physical obstruction during the pit formation process. This requirement not only increases the cost but also introduces many undesirable properties that severely limit the usefulness of the recording element. Another mechanism is to use the laser beam to cause the fusing or chemical interaction of several layers into a different layer. This mechanism suffers from the requirement of relatively high laser power.

Yet another approach is to use organic dye as the recording layer. Although used successfully in CD-R disks, this mechanism suffers from its strong wavelength dependence. The optical head used in the DVD devices operating at 650 nm, for example, is not able to read the CD-R disks designed to work at the CD wavelength of 780 nm. Furthermore, a dye-based recording element tends to require more laser power for recording, and may have difficulties supporting recording at high speeds.

A desirable approach is based on amorphous-crystalline phase-change mechanism. This phase-change mechanism is the basis for the re-writeable DVD disks that have been introduced as DVD-RAM and DVD-RW products in the market. A phase-change based DVD-WORM disk will have the best similarity in characteristics with the re-writeable DVD disks, and it can share the same manufacturing equipment with the re-writeable disks. Both of these are highly desirable. Since the WORM feature requires disks that cannot be re-written, different phase-change materials or disk constructions need to be used from those conventionally used for rewriteable disks. Commonly-assigned U.S. Pat. Nos. 4,904,577; 4,798,785; 4,812,386; 4,865,955; 4,960,680; 5,271,978, 4,774,170; 4,795,695; and 5,077,181 teach various alloys that can be used for write-once phase-change recording. When these alloys are used to construct a WORM optical recording element, the recording laser beam is used to change the atomic structure of the recording phase-change material from the amorphous state to the crystalline state. Optical recording elements based on these alloys have many advantages over other WORM optical recording elements. In particular, it can be used in a simple, single-layer construction that drastically reduces manufacturing costs. However, since the reflectivity of the crystalline state is usually higher that of the amorphous state, the recorded data marks appear brighter than the surrounding area. These optical recording elements are hereon referred to as "burn-bright" type optical recording elements. This is in contrast to ROM disks, such as DVD-ROM and DVD-video disks, which all have recorded marks with lower effective reflectivity than the surrounding area. These types of optical recording elements are hereon referred to as "burn-dark" optical recording elements. Drives that are designed to work with burn-dark type optical recording elements frequently cannot read burn-bright type optical recording elements. Thus, the burn-bright type phase-change optical recording elements are incompatible with the popular drives designed for burn-dark type ROM optical recording elements. This incompatibility limits the usefulness of the burn-bright type phase-change optical recording elements and is highly undesirable. This type of optical recording elements can therefore not be used as DVD-WORM.

It is a well-known requirement that DVD disks should have a reflectivity higher than about 18% and a contrast value higher than 0.60. Here, the contrast $I^{14M}$ is defined as $$I_{14M} = (I_{14H} - I_{14L})/I_{14H}$$

wherein $I^{14H}$ is the reflectivity signal off the un-recorded amorphous region, and $I^{114L}$ is the reflectivity signal off a long recorded crystalline mark. All reflectivity signals were measured using the read laser beam in a fully recorded disk. It is believed that a reflectivity value of larger than about 28% as measured by a collimated beam on an unrecorded disk is needed to achieve the 18% reflectivity requirement. In DVD, the marks are sub-resolved meaning that the read laser spot is actually larger than the recorded marks. The $I^{14L}$ signal, therefore, is not just a measure of the crystalline state reflectivity, but also includes contribution from the surrounding amorphous area. Similarly, the $I_{14H}$ signal is a not just a measure of reflectivity from the un-recorded amorphous region but also it includes some contribution from recorded crystalline marks on the neighboring tracks. It is believed that with the reflectivity >18% requirement, the contrast of 0.6 is only achievable if the collimated-light reflectivity of the crystalline state is less than about 15%. Since the collimated-light data also includes reflected light from the front surface of the transparent substrate, the required reflectivity off the surface of the phase-change surface is actually less than 10%. A highly tuned optical structure such as a quadri-layer structure is therefore necessary to meet the requirements.

Nagata et al. (K. Nagata, S. Furukawa, Y. Kamioka, N. Yamada, and N. Akahira "phase-shift recording characteristics of phase-change optical disc", The 44$^{th}$ Spring Meeting; The Japan Society of Applied Physics and Related Societies, Mar. 31, 1997) teach the construction of a WORM disk using a phase-change material in a quadri-layer structure. The disk structure comprises a substrate onto which a dielectric layer, an amorphous state-change layer, another dielectric layer, and a metallic reflector layer are formed. The thickness and the materials of the layers are selected such that when the amorphous material crystallizes by the recording laser beam there is little change in reflectivity. Instead, a substantial change in the optical phase of the reflected beam is produced. Light reflected from the crystalline marks interferes destructively with that reflected from the surrounding amorphous area and the recorded marks appear dark upon read back. Although this approach is successful in producing dark recorded marks, the reflectivity of the un-recorded disk at around 10% is lower than the 28% value required to be compatible with the reflectivity of the DVD format disks.

SUMMARY OF THE INVENTION

It is an object of the present invention to provide WORM optical recording elements based on phase-change materials.

It is a further object of the invention to provide WORM optical recording elements that are the burn-dark type.

It is a further object of the invention to provide phase-change type WORM optical recording elements that do not need to be pre-crystallized before data can be recorded on the optical recording elements.

It is another object of the invention to provide phase-change type WORM optical recording elements that possess true-WORM characteristics in that once the data are written, they cannot be altered without being detected.

It is still another object of the invention to provide WORM optical recording elements that meet the contrast and other physical requirements of the DVD format disks.

These objects are achieved in a WORM optical recording element comprising:

(a) a substrate;

(b) an amorphous phase-change recording layer disposed over the substrate;

(c) a dielectric layer disposed adjacent to the amorphous phase-change layer;

(d) a reflector layer disposed adjacent to the dielectric layer; and (e) wherein the material and the thickness of the layers are selected such that;

(i) recording can be performed on the optical recording element by using a focused laser beam to form crystalline marks in the phase-change layer using laser pulses of less than 40 nS in duration;

(ii) the reflectivity of the amorphous phase as measured by a collimated beam is higher than 28% and the contrast of the read-back signal is higher than 0.6; and (iii) the second and subsequent writing over previous recording results in at least a 50% increase in read out jitter.

The present invention has advantages in that it can be used in WORM optical recording elements that do not require initialization (pre-crystallization) as part of the manufacturing process; it possesses true-WORM characteristics, and it can meet the established DVD physical requirements. It is to be understood that, although designed to function as a DVD-WORM optical recording element, the invention can be used for other WORM elements, such as an optical tape.

DETAILED DESCRIPTION OF THE PREFERRED EMBODIMENTS

Figure 1:
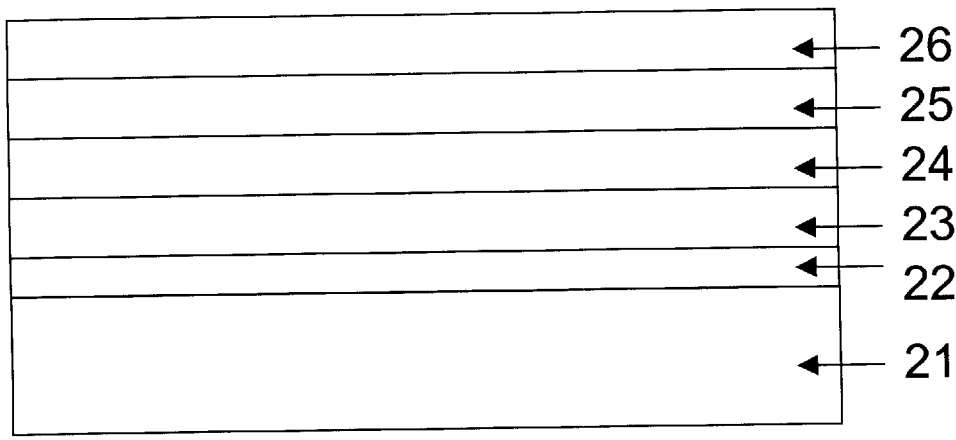
FIG. 1 is a cross-sectional view of a prior art optical recording optical recording element such as a rewriteable optical disk.

Optically tuned multi-layer structures are commonly used to construct optical phase change elements. It will be understood that such optical phase change elements can be embodied in optical disks or in optical tape, for example. FIG. 1 shows a schematic cross section of one example of an optical recording element in the prior art and is designated by the reference number 10. This structure is commonly used to construct a re-writeable optical recording element and is generally configured as a disk. It includes a transparent substrate 21, typically fabricated from polycarbonate, to provide support for the other layers. Coated on the substrate 21 is dielectric layer 22, which for example can be fabricated from ZnS:SiO$_2$, a mixture of ZnS and SiO$_2$. Onto the dielectric layer 22 is a crystalline phase-change recording layer 23 that can be melted and quenched into the amorphous state by writing with a focused laser beam applied through the substrate 21. The recording laser beam is most commonly from a laser diode. Onto the phase-change layer 23 there is coated a second dielectric layer 24, which for example can also be fabricated from $ZnS:SiO_2$. A metallic reflector layer 25 highly reflective to the recording laser beam, which for example can be fabricated from an aluminum alloy, is coated on the dielectric layer 24. Finally, a protective layer 26 is typically a lacquer material. The typical thickness of the layers is about 100 nm for the first dielectric layer 22, 20 nm for the crystalline phase-change recording layer 23, 20 nm for the second dielectric layer 24, 100 nm for the reflector layer 25, and 3000 nm for the protective layer 26, respectively. This multi-layer construction forms a tuned optical structure and the reflectivity of the optical recording element is highly dependent on the optical properties as well as the thickness of the materials involved. Typically, the construction is selected such that to have a very low reflectivity for the amorphous state and a much higher reflectivity for the crystalline state. The recording process makes amorphous marks in the crystalline phase-change recording layer 23, which appear dark relative to the crystalline background because of their lower reflectivity. Sometimes additional layers are used to serve certain special functions, such as to improve cycling or to increase crystallization rate. In all cases, however, the reflectivity is lower for the amorphous state than the crystalline state.

As pointed out by Chen and Rubin (U.S. Pat. No. 5,242,784), however, the lower reflectivity of the amorphous-state in a re-writeable phase-change disk is in fact undesirable. In order to perform the recording operation, the recording laser heats a spot on the phase-change material to above the melting point and changes it to a liquid state. When the laser is turned off, the material cools and the amorphous state is created. The optical properties of the liquid state are similar to those of the amorphous state. In this conventional optical recording elements construction, the reflectivity of the liquid state is lower, therefore, than that of the crystalline state and the absorption of the laser light is stronger. Once the material melts, it will absorb more laser heat and will be heated to even higher temperature. This additional heating is not only unnecessary but also potentially harmful. It could, for example, cause permanent damage to the optical recording elements package. Chen and Rubin teach a different optical recording elements package that reduces this problem. In their teaching, the thickness of the crystalline phase-change recording layer 23 is reduced to about 10 nm and the thickness of the second dielectric layer 24 is increased to about 175 nm. The resulting structure has a higher reflectivity in amorphous or liquid state than in crystalline state. The increased reflectivity upon melting reduces the absorption of the laser energy and reduces the excess heating of the molten phase-change material. Although the crystalline state appears darker than the amorphous state in this design, however, both states are highly reflectivity having reflectivity of 35% and 60%, respectively. The reflective contrast between the two states, as defined earlier in the text, is expected to be much below the required 0.6.

In re-writeable disks, it is desirable to write new data directly over existing data without first erasing the later, a process called direct-overwrite by those skilled in the art. In a direct-overwriting process, the writing laser pulses are modulated at three power levels. The high power pulses melt the phase-change material and leave it in the amorphous state. The intermediate power level crystallizes the material and leaves it in the crystalline state. The low power level controls the cooling of material after the high power pulses to facilitate the formation of the amorphous phase after the high power pulses. These writing pulses are applied according to the data pattern to be recorded without paying attention to the data pattern originally recorded on the optical recording element. The reflectivity difference between the amorphous state and the crystalline state on the pre-recorded optical recording element causes different absorption of laser power. Hence, the originally amorphous and crystalline regions experience different amount of heating that could result in variations in the size and shape of the new data marks. This variation causes recording noise and is undesirable. To reduce this undesirable effect, it has been found important to design the optical recording elements such that the crystalline state has lower reflectivity and higher absorption of laser power than the amorphous state. Nishimura, et al (K. Nishimura, T. Suzuki, K. Takeguchi, M. Terada, and I. Morimoto: Proceedings SPIE, Vol. 2514, pp. 319–328) and Kobori, et al (H. Kobori, H. Hasegawa, T. Sugaya, N. Nakamura, N. Morishita, T. Kobayashi, and K. Suzuki: proceedings SPIE, Vol. 2514, pp. 312–318) disclosed the design of a five-layer disk to accomplish this purpose. By adding a thin Au layer between the first dielectric layer 22 and the substrate 21, they were able to achieve lower reflectivity in the crystalline state than in the amorphous state. The Nishimura et al and Kobori et al do not give enough details to allow an accurate calculation of the reflectivity contrast achieved, but the five-layer structure is very complicated and potentially expensive.

In view of the foregoing discussion it is not surprising that there have been incentives to design phase-change optical recording element with higher reflectivity in the amorphous state than in the crystalline state. No desirable solutions have been devised. It was discovered quite unexpectedly that a burn-dark optical recording elements based on amorphous phase-change layer can indeed be constructed using a very simple layer-structure provided the materials and the layer thickness are selected appropriately.

Figure 2:
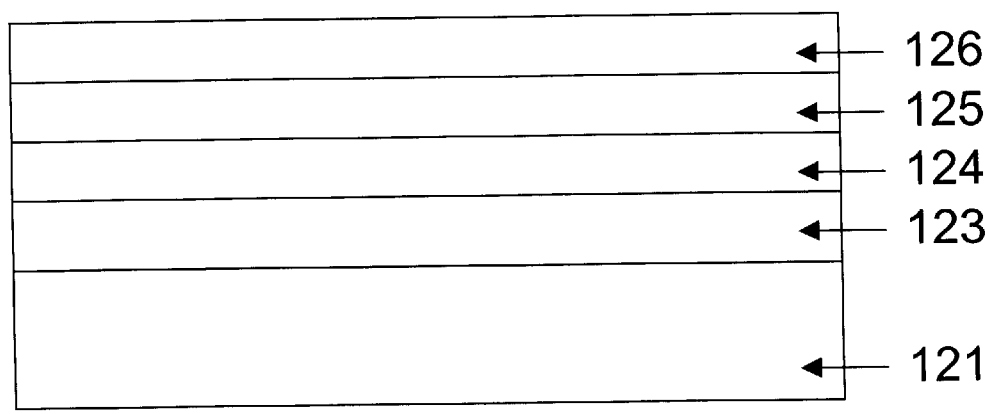
FIG. 2 is a cross-sectional view of a WORM optical recording element according to the present invention.

FIG. 2 shows a schematic cross section view of a optical recording elements according to the current invention that is particularly suitable for use as a DVD recordable disk and is designated by the reference number 100. It includes a transparent substrate 121, typically fabricated from polycarbonate, to provide support for the other layers. Coated on the substrate is an amorphous phase-change recording layer 123 that can be crystallized by recording laser beam applied through the substrate 121. Onto the amorphous phase-change layer 123 there is coated a dielectric layer 124, which for example can be fabricated from $ZnS:SiO_2$. A metallic reflector layer 125 highly reflective to the recording laser beam, which for example can be fabricated from an aluminum alloy, is coated on the dielectric layer 124. Finally, the protective layer 126 is typically a lacquer material. The typical thickness of the layers is about 8 nm for the amorphous phase-change layer 123, 90 nm for the dielectric layer 124, and 100 nm for the reflector layer 125, and 3000 nm for the protective layer 126, Turning now to FIG. 3, an optical recording element is shown according to the present invention that is particularly suitable for use as a optical tape and is designated by the reference number 200. It includes a substrate 221, typically fabricated from polyethylene terephalate (PET) to provide support for the other layers. Coated on the substrate 221 is a metallic reflector layer 225 highly reflective to the recording laser beam, which for example can be fabricated from an aluminum alloy. Coated on the reflector layer 225 is a dielectric layer 224, which for example can be fabricated from $ZnS:SiO_2$. Coated on the dielectric layer 224 is an amorphous phase-change recording layer 223 that can be crystallized by a recording laser beam. The typical thickness of the layers is about 6 nm for the amorphous phase-change layer 223, 80 nm for the dielectric layer 224, and 100 nm for the reflector layer 225, and 3000 nm for the protective layer 126, Using a thin-film modeling program, the inventors calculated the reflectance of a optical recording element 200 over a wide range of optical properties and a wide range of thickness for the phase-change and dielectric layers. For these calculations, a 100 nm aluminum-1%Cr alloy layer is used as the reflector 125 and the laser wavelength is set to be 650 nm. The thickness of the reflector layer needs only to be sufficient to allow an optical density of larger than about 2, a thickness of about 40 nm is generally adequate. As a result of these extensive calculations, the inventors discovered that a WORM optical recording elements that meet the objects of the current invention can indeed be achieved if proper phase-change material and proper layer thickness are used. The following are the findings based on the results of these calculations.

To create low enough crystalline state reflectivity (<15%) the thickness of the phase-change layer 123, $t_{pc}$, in nanometers, has to meet the following condition EQ. 1:

$$146/(n_c \times k_c) \geq t_{pc} \geq 36/(n_c \times k_c)$$

and the thickness, $t_d$, in nanometers, of the dielectric layer 124 has to satisfy the condition EQ. 2:

$$(2/n_d)[94.5+69 \log (n_c/k_c)] \geq t_d \geq (2/n_d)[40+90 \log (n_c/k_c)]$$

where $n_c$ and $k_c$ are the real and imaginary part of the optical indexes of the crystalline phase, respectively, and $n_d$ is the optical index of the dielectric layer. For any phase-change thickness that satisfies EQ. 1, there will be a dielectric layer thickness $t_d$ within the range specified in EQ. 2 that makes the reflectivity of the crystalline phase less than the required 15% value. Here the reflectivity is measured by a spectrophotometer using collimated light.

To achieve an adequate contrast and an adequate amorphous state reflectivity, however, another condition has to be met: EQ. 3;

$$((n_\alpha - n_c)^2 + (k_\alpha - k_c)^2) / (n_\alpha + n_c + k_\alpha + k_c)^2 \geq 0.015$$

wherein $n_\alpha$ and $n_c$ are the real part of the optical indices and $k_\alpha$ and $k_c$ are the imaginary part of the optical indices of the amorphous and crystalline state, respectively.

EQ. 3 teaches the selection of the phase-change materials and the EQ. 1 and EQ. 2 teaches the range of layer thickness that has be used to construct a WORM optical recording element to meet the optical requirements. Although the equations were established based on 650 nm laser and aluminum reflector, the same general principle can also be applied to other laser wavelengths and other reflectors. A second dielectric layer can also optionally be inserted between the phase-change layer 123 and the substrate 121 without substantially changing the principle of these rules. In addition, for the optical recording element 200 illustrated in FIG. 3, similar equations can also be calculated.

Phase-change material in accordance with this invention should be selected such that such phase-change material can be crystallized by the recording laser beam under the radiation conditions dictated by the desired recording operation. For DVD-R type recording, for example, the laser beam used for recording the data is delivered in short pulses. For real time recording, (1× speed), these laser pulses are about 20 nS or less in duration; for a 2× speed recording, the corresponding pulses are less than 10 nS in duration. It is imperative, therefore, that the phase-change material can have enough crystallization speed to form complete crystalline marks in such short time periods.

The Example below illustrates the application of these principles in designing a working WORM optical recording element.

A WORM optical recording element was constructed according to FIG. 2. The substrate 121 in the form of a disk was made of injection molded polycarbonate with a thickness of about 0.6 mm. On one surface of the disk, there was molded a continuous spiral groove that extended from the inside diameter of the disk to the outside diameter of the disk. The groove was used for guiding the laser beam for recording and read-back of the data. The groove had a track-pitch of about 0.74 µm, similar to what is used for the DVD format disks. A phase-change layer 123 was then DC-sputtered onto the polycarbonate substrate. The phase-change layer had a composition of $Sb_{70}In_{15}S_{15}$ and a thickness of about 8.8 nm. The optical index of the amorphous phase of this material was $n_\alpha = 4.50$ and $k_\alpha = 3.00$; and of the crystalline phase $n_c$ 32 2.42 and $k_c = 5.02$. A $ZnS:SiO_2$(80:20) layer was then RF-sputtered onto the phase-change layer. This layer was used as the dielectric layer 124 and had a thickness of about 100 nm. A 100 nm Al:1%Cr reflector layer 125 was then sputter-coated onto the dielectric layer, followed by a spun-on lacquer protector layer 126 of about 5 µm in thickness.

Checking against EQ.1, the phase-change layer thickness of 8.8 nm falls between the lower limit of $36/n_c k_c = 2.9$ nm and the upper limit of $146/n_c k_c = 12.0$ nm. Checking against EQ.2, the dielectric layer thickness of 86 nm falls between the lower limit of $(2/n_d)[40 + 90 \log (n_c/k_c)] = 74.8$ nm and the higher limit of $(2/n_d)[94.5 + 69 \log (n_c/k_c)] = 116.5$ nm. Furthermore, checking against EQ. 3, the phase-change layer has optical indices that give $((n_\alpha - n_c)^2 + (k_\alpha - k_c)^2) / (n_\alpha + n_c + k_\alpha + k_c)^2 = 0.038$ which is greater than the required 0.015 value. This disk was therefore fabricated according to the teaching of the current invention.

The disk was tested on a Pulstec DDU-1000 DVD tester equipped with a 635 nm wavelength laser and a 0.6 NA objective. A random EFM+data pattern was recorded on the disk while it was spinning to yield a optical recording elements linear speed of 8.8 m/s, which is about 2.5 times the read speed of a standard DVD disk. A multi-pulse write-strategy was used. The 3T marks were recorded using a single 8 nS pulse and for (3+n)T marks additional n pulses of 6 nS duration were added. The end of the pulses was lined up with the falling edge of the clock pulses. The power of the write pulses was 4.2 mW.

The reflectivity of the disk as measured by the focused laser beam was 22.1%. The recorded marks had lower reflectivity, and the measured contrast value $I_{14M} = (I_{14H} - I^{14L})/I_{14H}$ was measured to be about 0.78. Both these values meet the DVD requirements.

This example clearly demonstrates the achievement of the objective using the teaching of the current invention. It is described in detail with particular reference to a preferred embodiment, but it will be understood that variations and modifications can be effected within the spirit and scope of the invention.

Figure 4:
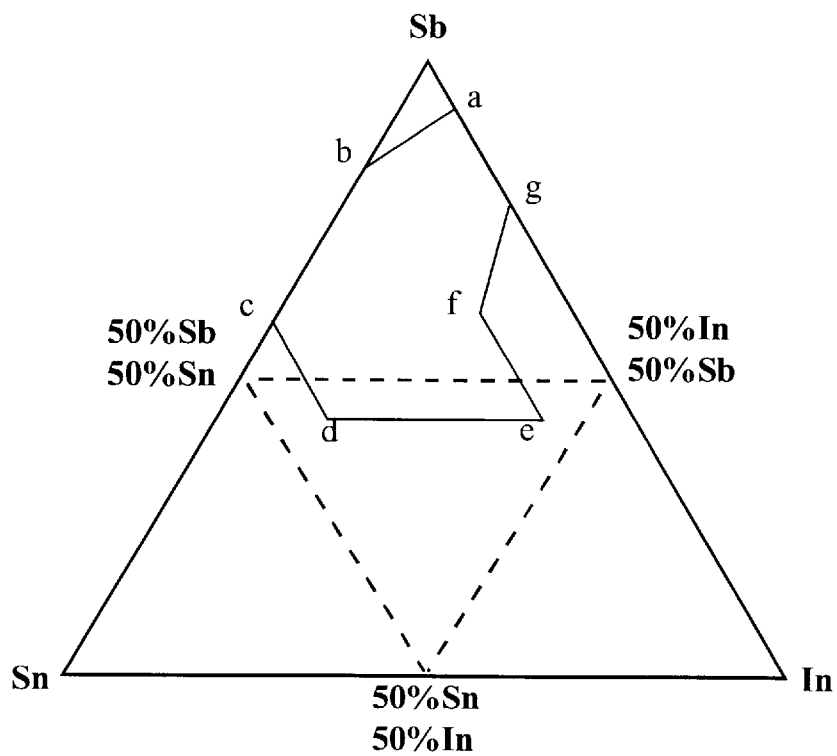
FIG. 4 is a ternary composition diagram of antimony, indium, and tin showing the preferred composition range to be used with the present invention.

For example, the phase-change material used in the example was a $Sb_{70}In_{15}Sn_{15}$ alloy. It is expected that all compositions which are usable in a preferred composition range within a polygon in a ternary composition diagram of antimony, indium, and tin; wherein the composition diagram is shown in FIG. 4 and the polygon has the following vertices and corresponding coordinates in atom percent:

|          | Coordinates |    |    |
| -------- | ----------- | -- | -- |
| Vertices | Sb          | Sn | In |
| a        | 97          | 0  | 3  |
| b        | 85          | 15 | 0  |
| c        | 60          | 40 | 0  |
| d        | 48          | 42 | 10 |
| e        | 44          | 10 | 46 |
| f        | 64          | 5  | 31 |

-continued

| Vertices | Coordinates | | |
|---|---|---|---|
| | Sb | Sn | In |
| g | 70 | 0 | 30 |

It is further expected that other phase-change compositions having fast crystallization characteristics such as the SbSn-X alloys wherein X is selected from the list Al, Zn, Ge, Cd, Ga, Ti, Si, Mn, Te, Nb, Fe, Fe, Cu, W, Mo, S, Ni, O, Se, Th, As, P, Au, Pd, Pt, Hf, and V; as well as some GeTe-X alloys wherein X is selected from Ti or Mn, can also be used. Similarly, other dielectric materials in the form of oxides, nitrides, sulfides or their mixtures are expected to function as well.

Figure 3:
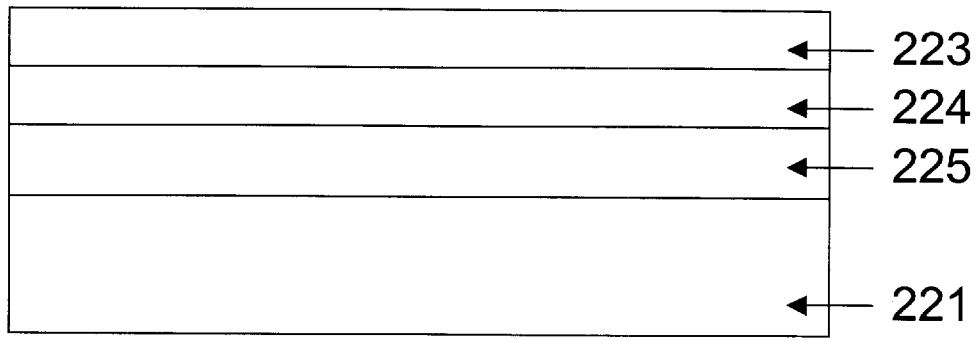
FIG. 3 is a ternary composition diagram of antimony, indium, and tin showing the preferred composition range to be used with the present invention.

The preferred embodiment uses a tri-layer structure including the phase-change layer, the dielectric layer, and the metal reflector layer as the principal layers. This tri-layer structure is preferred for simplicity and cost reasons, but it is understood that in the optical recording element 100 as shown in FIG. 2 an additional dielectric layer can be used between the phase-change layer 123 and the substrate 121 without adversely affecting the performance of the disk. Similarly, in the optical recording element 200 as shown in FIG. 3 another dielectric layer can be applied over the amorphous phase-change layer 223 without violating the essence of the present invention.

The invention has been described in detail with particular reference to certain preferred embodiments thereof, but it will be understood that variations and modifications can be effected within the spirit and scope of the invention.

PARTS LIST

| 10 | optical recording element |
| 21 | substrate |
| 22 | dielectric layer |
| 23 | phase-change recording layer |
| 24 | dielectric layer |
| 25 | metallic reflector layer |
| 26 | protective layer |
| 100 | optical recording element |
| 121 | substrate |
| 123 | phase-change recording layer |
| 124 | dielectric layer |
| 125 | reflector layer |
| 126 | protective layer |
| 200 | optical recording element |
| 221 | substrate |
| 224 | dielectric layer |
| 225 | reflector layer |

What is claimed is:

1. A WORM optical recording element comprising:
   (a) a substrate;
   (b) an amorphous phase-change recording layer disposed over the substrate;
   (c) a dielectric layer disposed adjacent to the amorphous phase-change layer;
   (d) a reflector layer disposed adjacent to the dielectric layer; and
   (e) wherein the material and the thickness of the layers are selected such that;
      (i) recording can be performed on the optical recording element by using a focused laser beam to form crystalline marks in the phase-change layer using laser pulses of less than 40 nS in duration;
      (ii) the reflectivity of the amorphous phase as measured by a collimated beam is higher than 28% and the contrast of the read-back signal is higher than 0.6; and
      (iii) the second and subsequent writing over previous recording results in at least a 50% increase in read out jitter.

2. The WORM optical recording element of claim 1 wherein the reflector layer is disposed on the substrate, the dielectric layer is disposed on the reflector layer and the amorphous phase-change layer is disposed on the dielectric layer.

3. The WORM optical recording element of claim 1 wherein the amorphous phase-change layer is disposed on the substrate, the dielectric layer is disposed on the amorphous phase-change layer and the reflector layer is disposed on the dielectric layer.

4. The WORM optical recording element of claim 1 wherein the thickness of the phase-change layer, $t_{pc}$, in nanometers, is selected such that $$146/(n_c \times k_c) \geq t_{pc}$$
$$\geq 36/(n_c \times k_c)$$

and the thickness, $t_d$ in nanometers, of the dielectric layer is selected such that $$(2/n_d)[94.5+69 \log (n_c/k_c)] \geq t_d \geq (2/n_d)[40 +90 \log (n_c/k_c)]$$

wherein $n_c$ and $k_c$ are the real and imaginary part of the optical indexes of the crystalline phase, respectively, and $n_d$ is the optical index of the dielectric layer; furthermore, the phase-change material is selected such that $$((n_\alpha - n_c)^2 + (k_\alpha - k_c)^2) /(n_\alpha + n_c + k_\alpha + k_c)^2 \geq 0.015,$$

wherein $n_\alpha$ is the real part of the optical index and $k_\alpha$ is the imaginary part of the optical index of the amorphous phase of the phase-change alloy.

5. The WORM optical recording element of claim 1 wherein the amorphous phase-change layer includes a SbSn-X alloy wherein X is selected from the group consisting of In, Al, Zn, Ge, Cd, Ga, Ti, Si, Mn, Te, Nb, Fe, Fe, Cu, W, Mo, S, Ni, O, Se, Th, As, P, Au, Pd, Pt, Hf, V and combinations thereof.

6. The WORM optical recording element of claim 1 wherein the amorphous phase-change layer includes a GeTe-X alloy wherein X includes Ti or Mn.

7. The WORM optical recording element of claim 1 wherein the phase-change layer has a composition within a polygon in a ternary composition diagram of antimony, indium, and tin; wherein
   (i) the composition diagram is

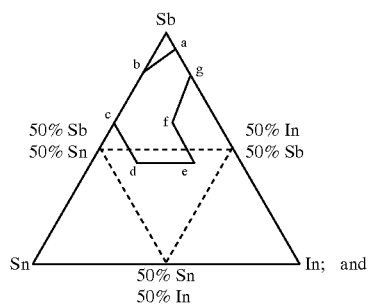

In; and (ii) the polygon has the following vertices and corresponding coordinates in atom percent:

|  | Coordinates | | |
| --- | --- | --- | --- |
| Vertices | Sb | Sn | In |
| a | 97 | 0 | 3 |
| b | 85 | 15 | 0 |
| c | 60 | 40 | 0 |
| d | 48 | 42 | 10 |
| e | 44 | 10 | 46 |
| f | 64 | 5 | 31 |
| g | 70 | 0 | 30 |

8. The WORM optical element of claim 7 wherein the amorphous phase-change alloy further contains oxygen.

9. The WORM optical element of claim 1 wherein the dielectric layer contains ZnS.

10. The WORM optical element of claim 1 wherein further including a top lacquer protective layer.

11. A method of recording in an WORM optical recording element including a substrate; an amorphous phase-change recording layer disposed over the substrate; a dielectric layer disposed adjacent to the amorphous phase-change layer; a reflector layer disposed adjacent to the dielectric layer; and wherein the material and the thickness of the layers are selected such that the method comprising recording on the optical recording element by using a focused laser beam to form crystalline marks in the phase-change layer using laser pulses with less than 40 nS in duration, whereby the reflectivity of the amorphous phase as measured by a collimated beam is higher than 28% and the contrast of the read-back signal is higher than 0.6, and the second and subsequent recording over a previous recording results in at least a 50% increase in read out jitter.

* * * * *